US006875486B2

(12) United States Patent
Miller

(10) Patent No.: US 6,875,486 B2
(45) Date of Patent: Apr. 5, 2005

(54) PACKAGE SYSTEM AND METHOD

(75) Inventor: Drayton Miller, 3928 McGregor Ct., Mobile, AL (US) 36608

(73) Assignees: Drayton Miller, Mobile, AL (US); Martin Fleit, Miami, FL (US)

(*) Notice: Subject to any disclaimer, the term of this patent is extended or adjusted under 35 U.S.C. 154(b) by 90 days.

(21) Appl. No.: 10/357,298

(22) Filed: Feb. 3, 2003

(65) Prior Publication Data

US 2004/0151851 A1 Aug. 5, 2004

(51) Int. Cl.[7] ............................................ B65D 1/00
(52) U.S. Cl. ................ 428/34.1; 428/34.2; 428/34.3; 428/35.7; 428/36.5; 428/71; 428/76; 428/913; 428/920
(58) Field of Search ................ 428/34.1, 34.2, 428/34.3, 35.7, 36.5, 71, 76, 913, 920

(56) References Cited

U.S. PATENT DOCUMENTS

2003/0128898 A1 * 7/2003 Malone et al. ............. 383/3

* cited by examiner

Primary Examiner—Sandra M. Nolan
(74) Attorney, Agent, or Firm—Martin Fleit; Paul D. Bianco; Fleit Kain Gibbons Gutman Bongini & Bianco

(57) ABSTRACT

A packaging system having a container, a first radiant barrier covering the exterior of the container, an insulator covering the interior of the container, a second radiant barrier positioned in the container within the insulator for surrounding a payload, a payload surrounded by the second radiant barrier, a first phase change material having a preselected phase change temperature surrounding the payload in close proximity therewith, and a second phase change material having a phase change temperature higher than the first phase change temperature surrounding the first phase change material in close proximity therewith and being in close proximity with the second radiant barrier.

16 Claims, 1 Drawing Sheet

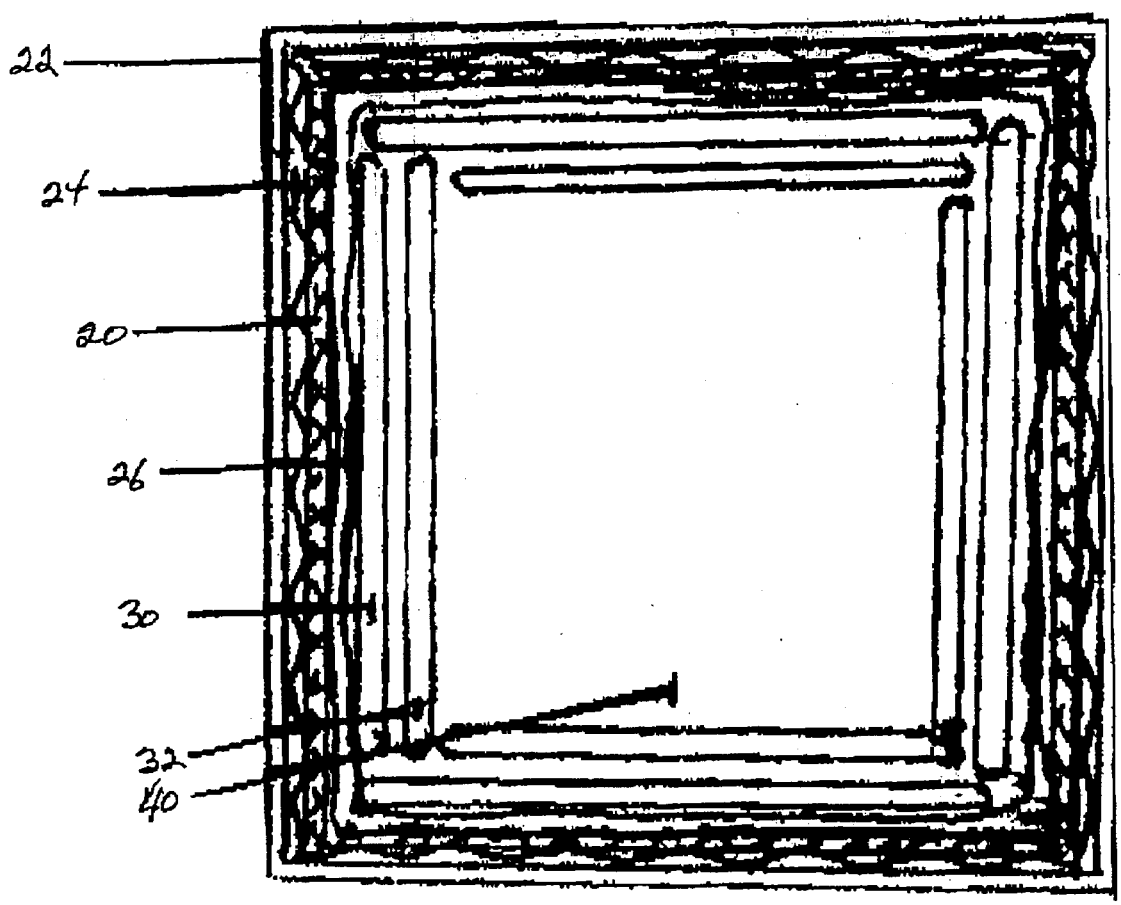

PACKAGE SYSTEM AND METHOD

BACKGROUND OF THE INVENTION

1. Field of the Invention

This invention relates to a novel method for packing and a novel package system for transporting products, such as, food and other goods under low temperature conditions, while maintaining the integrity of the package and the low temperature conditions for an extended period of time to enable shipment to distant destinations and even worldwide.

2. Prior Art

The ability to ship products, such as food and other goods like medical and drug supplies, such as biological materials, pharmaceuticals, medicines and blood, for long distances requiring days for completion and delivery, is especially difficult when the products are dated or perishable and need to be preserved or their integrity or efficacy need to be maintained by maintaining the payload at low temperature during transit while keeping the cost of transport cost effective and acceptably economical. There is always a general concern for the safety and wholesomeness of the products being delivered. Whereas various systems have been advanced for this purpose, nevertheless, prior known systems can only secure delivery of perishable or dated products in pristine condition for two or three days at the maximum, thereby limiting the distances such products can be shipped at low temperature with guaranteed arrival at the proper low temperature.

SUMMARY OF THE INVENTION

The present invention provides a packaging system that advances the art by enabling the shipment under low temperature conditions for periods of time of up to 150 hours while effectively maintaining the low temperature conditions and thereby guaranteeing the integrity, wholesomeness and efficiousness of the products being shipped.

The objects and advantages of the present invention are accomplished by using a package construction that utilizes two or more radiant barriers separated in the packaging by a container in combination with suitable insulation. Within the inner radiant barrier is contained two or more phase change materials which change phase at different temperatures. The outer radiant barrier covers the exterior of the packaging.

According to the invention, a packaging system is provided having a container, a first radiant barrier covering the exterior of the container, an insulator covering the interior of the container, a second radiant barrier positioned in the container within the insulator for surrounding a payload, a payload surrounded by the second radiant barrier, a first phase change material having a preselected phase change temperature surrounding the payload in close proximity therewith, and a second phase change material having a phase change temperature higher than the first phase change temperature surrounding the first phase change material in close proximity therewith and being in close proximity with the second radiant barrier.

Further, the packaging system may be characterized wherein the first phase change material has a phase change at minus 20 degrees centigrade, and wherein the second phase change material has a phase change at zero degrees centigrade. Also, the phase change materials may be in the form of gel packs. The container is a rigid construction made of corrugated cardboard with its exterior completely covered with the first radiant barrier in the form of a film bonded to the cardboard. The insulator is preferably plastic foam.

The packaging system has the second radiant barrier in the form of a flexible container, such as a bag or pouch, comprised of an outer laminate of radiant barrier material and an inner laminate of plastic durable at low temperatures.

The invention also contemplates the method of packing a container for shipment and comprising the steps of preparing a rigid container with an outer covering of a radiant barrier, lining the interior surface of the rigid container with insulator board, placing a flexible container in the rigid container with the bottom of the flexible container contacting the bottom of the rigid container, covering the bottom of the flexible container with first gel packs of a first predetermined phase change material, covering the first gel packs with second gel packs of a phase change material of a second phase change material having a lower phase change temperature, placing a payload on the second gel packs, surrounding the remaining portions of the payload with second gel packs, surrounding the remaining portions of the second gel packs with first gel packs, closing and sealing the flexible container, covering the closed and sealed flexible container with insulator board, and closing and sealing the rigid container. Preferably, the packing is done in an atmosphere at a temperature of at least 10 degrees centigrade less than the temperature at which the payload is to be shipped.

Other and further objects and advantages of the present invention will become readily apparent from the following detailed description of preferred embodiments when taken in conjunction with the appended drawing.

BRIEF DESCRIPTION OF DRAWING

The sole FIGURE of the drawing shows schematically in section the novel package construction and use of the present invention.

DETAILED DESCRIPTION OF PREFERRED EMBODIMENTS OF THE INVENTION

As shown in the sole drawing the novel packaging system consists of a multiple phase-change, insulated, radiant barrier shipping system that utilizes the following components:

1. two or more phase-change materials which change phase at different temperatures;
2. insulation;
3. two or more radiant barriers;
4, container, For optimum performance the multiple phase-change, insulated, radiant barrier shipping system would be configured as follows:

1, a radiant barrier of aluminum foil or metallized film 22 that covers the exterior of a container 20, 2. a form of insulation 24 is positioned to the face of the interior sides (including the top and bottom) of the container 20;

3. a radiant barrier of aluminum foil or metallized film 26 is positioned to the face of the interior of the insulation (this may also be in the form of a radiant barrier of aluminum foil or metallized film, bag or pouch);

4. a form of a first higher phase-change material 30 (which changes phase at a higher temperature than a second phase-change component 32) is positioned to face the interior of the radiant barrier of aluminum foil or metallized film 26;

5. a form of a second lower temperature phase-change material 32 (which changes phase at a lower temperature than the first phase-temperature phase-change material 30 facing toward the outside), the lower temperature phase-change material 32 facing inside toward the payload 40, 6. the payload 40 faces the interior of the lower temperature phase-change material 32;

7. the above construction and sequence of materials is the same with regard to all sides of the container 20.

The novelty of the present invention is the construction of the package system and the method of assembly and use, and the configuration of materials: 1) multiple radiant barrier materials facing each other across a thermal break; 2) multiple and different (different meaning that they change phase at different temperatures) phase-change materials in one shipping system; 3) multiple phase-change materials configured so that the higher temperature phase-change material faces toward the outside and the lower temperature phase-change material faces inside toward the payload.

The two radiant barriers 22 and 26 are separated by a thermal break or air gap. In this instance the insulation 24, which can be in the form of Styrofoam or any like plastic foam material, provides four critical aspects: 1) it provides the requisite thermal break or air gap; 2) it maintains a uniform (quantifiable, known) thermal break or air gap; 3) it prevents the radiant barriers 22 and 26 from touching, thus precluding any chance for conductive heat transfer between the radiant barriers such as would occur if they touched and; 4) it serves its purpose as an insulator.

By having multiple phase-change materials in the same system, one gains and enjoys the benefits of prolonged endurance as the phase-change materials pass through their phase changes, For example, if there were only one (a first) phase change material in the form of a phase-change gel pack(s) 32 being used in the system surrounding the payload 40, that changed phase at minus 20 degree centigrade, the system would only have the endurance of that one phase change. When, a second, different, higher temperature phase-change gel pack(s) 30, say one that changed phase at zero degrees centigrade were included in the system, to the exterior of the first gel pack(s) 32, that is, on the side of the first gel pack(s) 32 remote from the payload 40, and the entire system were frozen to minus 30 degrees centigrade, gradually the payload 40 would come up to minus 20 degrees centigrade, hold at that temperature while the first gel pack(s) 32 went go through the endurance of that phase change, and then, gradually go up to zero degrees centigrade, and then, hold at that temperature while the second gel pack(s) 30 went through the endurance of that phase change as well.

Lastly, there is a phenomenon or "gestalt" effect (where the whole is equal to more than the sum of its parts) that occurs with the proper configuration of the phase-change materials. For example, if the higher phase-change zero degrees centigrade gel pack(s) 30 are placed or positioned toward the outside of the container 20 with respect to the payload and the lower phase change minus 20 degrees centigrade gel pack(s) 32 are placed or positioned to the inside of the container 20 with respect to the payload 40, more endurance is obtained than if the reverse arrangement were to be made, i.e. with the lower phase change materials on the outside relative to the higher phase change materials with respect to the payload, and certainly significantly greater endurance over using only one phase change material. According to the invention, it is postulated that more endurance is obtained with the construction and method of the present invention because with the higher (zero) phase-change material to the outside: 1) the higher (zero) phase-change material is closer to the outside ambient temperature than the lower (minus 20) phase-change material and; 2) the higher (zero) phase-change material acts as an insulator for the lower (minus 20 degrees centigrade) phase-change material, thus prolonging the duration of the phase change itself.

This package system, made according to the present invention, keeps product frozen in a container, in an outside ambient temperature of 72 degrees Fahrenheit, for up to 150 hours, equivalent to six days. This enables shipment with security and safety anywhere in the world without danger of product deterioration, even product with a very short useful life.

The outer radiant barrier 22 can be any film or foil as known to persons skilled in this art. The container 20 is a rigid construction and may be pressboard, composition board, corrugated cardboard (preferred), or any other material known to persons skilled in the art as useful for this purpose. A corrugated box with top and bottom flaps is the preferred rigid container. The outer radiant barrier is applied to and bonded to the outer surface of the container 20 on all sides, top and bottom and is comprised of a film or laminated structure with the exterior lamination being a radiant barrier. Such materials are well known to those of skill in the art. The insulator 24 can be any insulation material providing the requisite R-value for the particular application, as known to persons skilled in this art. It is preferred that a plastic foam, such as foamed or expanded polystyrene, be used in a thickness as required to obtain the desired R-value, as will be readily evident to those of ordinary skill in the art. The insulator 24 is used in the form of linings, sheets, boards or packing or stuffing in the form of pieces of foamed polystyrene, such as geometrical shapes, e.g. balls, rods, discs and the like. The insulation is either placed into the container 20, if sheets or boards, or dropped into the container as a packing or stuffing so long as it covers the interior of the container 20 completely, all sides, top and bottom, and totally surround the inner radiant barrier 26. The inner radiant barrier 26 is also a film or foil like the outer radiant barrier 22, but is preferably laminated to a heavier plastic film of any suitable material, as is known to persons skilled in the art, to provide a flexible container, such as a bag or pouch, within which the gel packs are located in layers.

When packing the system of the present invention, the packing of the container 20, i.e. the assembly of the container with the components noted above and the payload 40, is preferably done at a temperature at least 10 degrees centigrade below the temperature at which it is desired to maintain the payload 40. First, the cardboard container 20 with the outer radiant barrier layer 22 covering its exterior is lined completely with insulation as noted above, such as, insulator boards 24 on all sides and on the bottom. The inner radiant barrier 26 in the form of a bag or pouch is placed in the lined container with the radiant barrier 26 facing the insulator 24, and with the top of the bag or pouch open fully. The higher temperature phase change material in the form of gel packs 30 are put in the bag or pouch to cover the bottom of the bag or pouch. The lower temperature gel packs 32 are then placed on top of gel packs 30. The payload 40 is then placed on the gel packs 32. Next, all the sides are filled in with a layer of gel packs 30 to the outside and an abutting layer of gel packs 40 to the inside facing the payload 40, as shown in the sole FIGURE. Finally, the top of the payload 40 is cover with gel packs 32, and then, gel packs 30 are placed to cover the layer of gel packs 32. The open bag or pouch is now drawn over the top of the gel packs 30 and sealed with suitable tape. Insulator boards 24 are placed to cover the top of the container 20 and the flaps of the container 20 are closed over the top insulator boards 24, and the flaps are sealed using suitable tape. The packaging system is now ready for shipment.

A third radiant barrier can be added to the packaging system by bonding a suitable a radiant barrier film to the side of each insulator board 24 that faces the rigid container 20 inside surfaces. Also, a third layer of phase change material in the form of gel packs can be added either surrounding the higher temperature phase change material 30 or intermediate the gel packs 30 and 32. In the embodiment as described, gel packs 32 change phase at minus 20 degrees centigrade and gel packs 30 change phase at zero degrees centigrade. If a third layer of gel packs is used having a temperature change of minus 10 degrees centigrade, the third layer would be placed in between gel packs 32 on the inside and gel packs 30 on the outside to give a temperature phase change of minus 20 degrees centigrade closest to the payload 40, surrounded by the gel packs having a phase change of minus 10 degrees centigrade, which in turn, are surrounded by the gel packs 30 having the phase change of zero degrees centigrade. The preferred and best mode of the invention is to have the phase change material packed in the container 20 with the lowest temperature phase change material closest to the payload, with the surrounding phase temperature materials progressively increasing in phase change temperature from lowest to highest most remote from the payload.

Although the invention has been shown and described in terms of preferred embodiments, nevertheless, such changes and modifications can be made by those skilled in the art without departing from the teachings herein as protected by the appended claims. The embodiments as disclosed herein, and such examples, illustrations, and theories are for explanatory purposes and are not intended to limit the scope of the claims.

What is claim is:

1. A packaging system comprising a container, a first radiant barrier covering the exterior of the container, an insulator covering the interior of the container, a second radiant barrier positioned in the container within the insulator for surrounding a payload, a payload surrounded by the second radiant barrier, a first phase change material having a preselected phase change temperature surrounding the payload in close proximity therewith, and a second phase change material having a phase change temperature higher than the first phase change temperature surrounding the first phase change material in close proximity therewith and being in close proximity with the second radiant barrier.

2. A packaging system according to claim 1 wherein the first phase change material has a phase change temperature of at least minus 20 degrees centigrade.

3. A packaging system according to claim 1 wherein the second phase change material has a phase change at zero degrees centigrade.

4. A packaging system according to claim 1 wherein the first phase change material has a phase change temperature of minus 20 degrees centigrade and wherein the second phase change material has a phase change temperature of zero degrees centigrade.

5. A packaging system according to claim 1 wherein the phase change materials are in the form of gel packs.

6. A packaging system according to claim 1 wherein the container is cardboard with its exterior completely covered with the first radiant barrier in the form of a film bonded to the cardboard.

7. A packaging system according to claim 1 wherein the insulator is a plastic foam.

8. A packaging system according to claim 1 wherein the second radiant barrier is in the form of a bag or pouch comprised of an outer laminate of radiant barrier material and an inner laminate of plastic durable at low temperatures.

9. A packaging system according to claim 1 wherein a third radiant barrier is provided interposed between and non-contacting the first and second radiant barriers.

10. A packaging system according to claim 1 wherein a third phase change material is included that is interposed between the first phase change material surrounding the payload in close proximity therewith, and the second phase change material having a phase change temperature higher than the first phase change temperature, said third phase change material surrounding the first phase change material in close proximity therewith and being surrounded by the second phase change material, said third phase change material having a phase change temperature in between that of the first and second phase change materials.

11. A method of packaging a container for shipment comprising the steps of
   a. preparing a rigid container with an outer covering of a first radiant barrier,
   b. lining the entire interior surface of the rigid container with insulator material,
   c. placing a flexible container including a second radiant barrier in the rigid container with the bottom of the flexible container contacting the bottom of the rigid container,
   d. covering the bottom of the flexible container with first phase change material having a first predetermined phase change temperature,
   e. covering the first phase change material with second phase change material having a phase change temperature lower than that of said first phase change material,
   f. placing a payload on the second phase change material,
   g. surrounding the payload with second phase change material,
   h. surrounding the second phase change material with first phase change material,
   i. closing and sealing the flexible container,
   j. covering the closed and sealed flexible container with insulator material, and
   k. closing and sealing the rigid container.

12. The method of claim 11 wherein a third phase change material having a phase change temperature in between that of the first and second phase change materials is interposed between the first and second phase change materials.

13. The method of claim 11 wherein a third radiant barrier is interposed in non-contacting relationship between the first and second radiant barriers.

14. A method of packing a container for shipment comprising the steps of
   a. preparing a rigid container with an outer covering of a first radiant barrier,
   b. lining the interior surface of the rigid container with insulator board
   c. placing a flexible container including a second radiant barrier in the rigid container with the bottom of the flexible container contacting the bottom of the rigid container,
   d. covering the bottom of the flexible container with first gel packs of a first predetermined phase change material, e. covering the first gel packs with second gel packs of a phase change material of a second phase change material having a lower phase change temperature,
f. placing a payload on the second gel packs,
g. surrounding the payload with second gel packs,
h. surrounding the second gel packs with first gel packs,
i. closing and sealing the flexible container,
j. covering the closed and sealed flexible container with insulator board, and
k. closing and sealing the rigid container.

15. The method of claim 14 wherein third gel packs containing a third phase change material having a phase change temperature in between that of the first and second phase change materials are interposed between the first and second gel packs.

16. The method of claim 14 wherein a third radiant barrier is interposed in non-contacting relationship between the first and second radiant barriers.

* * * * *